US008415585B2

(12) United States Patent
Sercel et al.

(10) Patent No.: US 8,415,585 B2
(45) Date of Patent: Apr. 9, 2013

(54) LASER MACHINING SYSTEMS AND METHODS WITH MULTIPLE BEAMLET LASER BEAM DELIVERY SYSTEMS

(75) Inventors: Jeffrey P. Sercel, Hollis, NH (US); Marco Mendes, Manchester, NH (US); Terrence A. Murphy, Jr., Pembroke, NH (US); Lawrence Roberts, Londonderry, NH (US); Xiangyang Song, Acton, MA (US); Michael Von Dadelszen, Merrimack, NH (US)

(73) Assignee: IPG Microsystems LLC, Manchester, NH (US)

( * ) Notice: Subject to any disclaimer, the term of this patent is extended or adjusted under 35 U.S.C. 154(b) by 812 days.

(21) Appl. No.: 12/576,504

(22) Filed: Oct. 9, 2009

(65) Prior Publication Data

US 2010/0089885 A1    Apr. 15, 2010

Related U.S. Application Data

(60) Provisional application No. 61/104,435, filed on Oct. 10, 2008.

(51) Int. Cl.
*B23K 26/00* (2006.01)
*B23K 26/08* (2006.01)

(52) U.S. Cl.
USPC ............. 219/121.67; 219/121.76; 219/121.85

(58) Field of Classification Search .......................... None
See application file for complete search history.

(56) References Cited

U.S. PATENT DOCUMENTS

| | | | |
|---|---|---|---|
| 5,319,183 A * | 6/1994 | Hosoya et al. ........... | 219/121.68 |
| 5,504,407 A | 4/1996 | Wakui et al. | |
| 5,676,866 A * | 10/1997 | in den Baumen et al. ........................ | 219/121.77 |
| 5,739,502 A | 4/1998 | Anderson et al. | |
| 5,854,460 A | 12/1998 | Graf et al. | |
| 6,008,943 A | 12/1999 | Metelitsa | |
| 6,028,376 A | 2/2000 | Osanai et al. | |
| 6,037,968 A * | 3/2000 | Emge et al. ................... | 347/260 |
| 6,087,625 A | 7/2000 | Iso | |
| 6,396,566 B2 | 5/2002 | Ebinuma et al. | |

(Continued)

FOREIGN PATENT DOCUMENTS

| DE | 102007060658 | 7/2009 |
|---|---|---|
| GB | 2457720 | 8/2009 |

(Continued)

OTHER PUBLICATIONS

US Office Action dated Jun. 14, 2012 in related U.S. Appl. No. 12/576,497.

(Continued)

*Primary Examiner* — Scott B Geyer
(74) *Attorney, Agent, or Firm* — Grossman Tucker Perreault & Pfleger, PLLC

(57) ABSTRACT

Multiple beamlet laser beam delivery systems and methods may be used in laser machining systems and methods to machine multiple regions on a workpiece simultaneously. One embodiment of a laser machining system and method may be used, for example, to scribe one or more lines in large flat workpieces such as solar panels. In particular, laser machining systems and methods may be used to scribe lines in thin film photovoltaic (PV) solar panels with accuracy, high speed and reduced cost. The multiple beam delivery systems may be movable to scribe multiple lines simultaneously in the workpiece.

32 Claims, 12 Drawing Sheets

U.S. PATENT DOCUMENTS

| | | | |
|---|---|---|---|
| 6,430,465 B2 | 8/2002 | Cutler | |
| 6,462,306 B1 * | 10/2002 | Kitai et al. | 219/121.77 |
| 6,531,867 B1 | 3/2003 | Greene et al. | |
| 6,586,707 B2 | 7/2003 | Boyle et al. | |
| 6,720,519 B2 * | 4/2004 | Liu et al. | 219/121.61 |
| 6,774,340 B1 | 8/2004 | Chiba et al. | |
| 6,781,138 B2 | 8/2004 | Novak et al. | |
| 6,909,735 B2 | 6/2005 | Lizotte et al. | |
| 6,917,412 B2 | 7/2005 | Poon et al. | |
| 6,919,530 B2 | 7/2005 | Borgeson et al. | |
| 7,067,763 B2 | 6/2006 | Schramm | |
| 7,321,418 B2 | 1/2008 | Sasaki et al. | |
| 7,324,867 B2 | 1/2008 | Dinauer et al. | |
| 7,642,484 B2 * | 1/2010 | Gross et al. | 219/121.73 |
| 7,880,117 B2 * | 2/2011 | Li et al. | 219/121.7 |
| 2002/0003616 A1 | 1/2002 | Ebinuma et al. | |
| 2002/0017511 A1 | 2/2002 | Kling | |
| 2002/0056891 A1 | 5/2002 | Wu | |
| 2002/0060210 A1 | 5/2002 | Terada et al. | |
| 2002/0086245 A1 * | 7/2002 | Zait et al. | 430/321 |
| 2003/0075529 A1 | 4/2003 | Mazumder et al. | |
| 2003/0127441 A1 | 7/2003 | Haight et al. | |
| 2004/0238507 A1 | 12/2004 | Schadler | |
| 2005/0247683 A1 | 11/2005 | Agarwal et al. | |
| 2005/0274703 A1 | 12/2005 | Kawakita et al. | |
| 2006/0006158 A1 * | 1/2006 | Lawrence et al. | 219/121.82 |
| 2006/0065640 A1 * | 3/2006 | Lizotte et al. | 219/121.61 |
| 2006/0289412 A1 | 12/2006 | Hamada | |
| 2007/0017908 A1 * | 1/2007 | Sercel et al. | 219/121.73 |
| 2007/0103660 A1 | 5/2007 | Tanaka | |
| 2007/0193990 A1 | 8/2007 | Richerzhagen et al. | |
| 2008/0012189 A1 | 1/2008 | Manz | |
| 2008/0067160 A1 | 3/2008 | Suutarinen | |
| 2008/0099452 A1 | 5/2008 | Akiyama et al. | |
| 2008/0105295 A1 | 5/2008 | Manz | |
| 2008/0105665 A1 * | 5/2008 | Kondo | 219/121.77 |
| 2008/0183332 A1 | 7/2008 | Ohm et al. | |
| 2008/0192322 A1 | 8/2008 | Scaggs et al. | |
| 2009/0000108 A1 | 1/2009 | Manz | |
| 2009/0321397 A1 | 12/2009 | Krishnaswami et al. | |

FOREIGN PATENT DOCUMENTS

| | | |
|---|---|---|
| WO | 2007078512 | 7/2007 |
| WO | 2009030409 | 3/2009 |
| WO | 2009098459 | 8/2009 |
| WO | 2009103946 | 8/2009 |
| WO | 2009103964 | 8/2009 |
| WO | 2009126899 | 10/2009 |

OTHER PUBLICATIONS

US Office Action dated Aug. 9, 2012 in related U.S. Appl. No. 12/576,508.

International Search Report and Written Opinion dated Dec. 10, 2009 issued in related International Patent Application No. PCT/US2009/060182.

International Search Report and Written Opinion dated Dec. 3, 2009 issued in related International Patent Application No. PCT/US2009/060188.

International Search Report and Written Opinion dated Dec. 10, 2009 issued in related International Patent Application No. PCT/US2009/060228.

Photon International, "Focusing on Lasers," Sep. 2009, p. 208.

Schulze, et al, "Laser Direct Machining—Diversity is Key," Mikromaterialbearbeitung, LTJ Mar. 2008, Nr. 2, p. 38-39.

Dunsky, et al., "Scribing thin-film solar panels," (Feb. 2008) available at http://205.157.169.116/display_article/318855/39/ARCHI/none/Feat/Scribing-thin-film-solar-panels, retrieved on Sep. 3, 2008 (3 pages).

Dunsky, "Lasers in the solar energy revolution," (Aug. 2007) available at http://www.coherent.com/Downloads/70410-186e-ILS.pdf, retrieved on Sep. 3, 2008 (3 pages).

International Search Report and Written Opinion dated Mar. 31, 2010 issued in related International Patent Application No. PCT/US2009/060153.

Westin, "Optimisation of Laser Scribing of Back Contact for Pholovoltaic Modules," Master of '-44 Science Program. Department of Applied Physics and Mechanicai Engineering Lulea University of Technology. 2005:102 CIV, ISSN: 1402-1617, ISRN; LTU-EX—05/102—SE. (2005).

* cited by examiner

LASER MACHINING SYSTEMS AND METHODS WITH MULTIPLE BEAMLET LASER BEAM DELIVERY SYSTEMS

CROSS-REFERENCE TO RELATED APPLICATION

The present application claims the benefit of U.S. Provisional Patent Application Ser. No. 61/104,435, filed Oct. 10, 2008, which is fully incorporated herein by reference.

TECHNICAL FIELD

The present invention relates to machining and more particularly, to laser machining systems and methods with multiple beamlet laser beam delivery systems.

BACKGROUND INFORMATION

Laser machining systems and methods are commonly used to machine various types of materials and structures. Such laser machining systems and methods may provide a number of advantages including lower manufacturing costs, increased throughput and production yield, and improved quality. In the area of solar panels, for example, the advantages of laser machining could significantly enhance the efficiency and viability of solar energy technology.

In the manufacture of thin film photovoltaic (PV) solar panels, laser machining techniques may be used to scribe the various thin film layers in a panel to form electrically connected cells. In one type of PV solar panel, three layers are deposited to form the panel and lines are scribed after each new deposition. The area on the panel including these lines is considered a wasted area that does not contribute to solar energy conversion. Thus, the lines should be straight and aligned accurately to minimize this wasted area and to provide the best efficiency. High scribing speeds and increased throughput are also desirable. Providing accurate high speed scribing of thin film PV solar panels (and other similar structures) presents a number of unique challenges.

Scribing lines on a workpiece with a laser beam involves moving the workpiece and/or the laser beam linearly. For large area workpieces, moving the workpiece at high speeds to effect scribing may be difficult or impossible, and it is often desirable to move the laser beam across the workpiece. Moving a laser beam delivery system, however, may adversely affect the positional accuracy and uniformity of the laser beam on the workpiece. Moreover, splitting a laser beam into multiple beamlets for scribing a workpiece may result in undesirable scribe variations such as variations in width, depth, fluence, heat-affected-zones and penetration, which can adversely affect the precision of the scribes.

Another challenge with laser machining of PV solar panels is the ability to maintain accuracy with the long working distance from the laser source to the workpiece and the large size of the panels. Angular pointing instability may result from the long working distance and longer beam delivery path. When the laser beam must travel longer distances to the workpiece and far-field scribing techniques are used, for example, the position of the laser spot focused on the workpiece can vary due to laser pointing variations, resulting in inaccuracies in line straightness and alignment.

The choice of the laser also presents challenges because of the nature of the thin film layers being scribed and because of the desire to lower the manufacturing cost of solar panels. Existing laser machining systems and methods often use single mode coherent beams. Using a coherent beam spot, however, may not result in the desired selective material removal and may not efficiently use the beam power.

BRIEF DESCRIPTION OF THE DRAWINGS

These and other features and advantages will be better understood by reading the following detailed description, taken together with the drawings wherein.

DETAILED DESCRIPTION

Multiple beamlet laser beam delivery systems and methods, consistent with various embodiments described herein, may be used in laser machining systems and methods to machine multiple regions on a workpiece simultaneously. One embodiment of a laser machining system and method may be used, for example, to scribe one or more lines in large flat workpieces such as solar panels. In particular, laser machining systems and methods may be used to scribe lines in thin film photovoltaic (PV) solar panels with accuracy, high speed and reduced cost. The multiple beam delivery systems may be movable to scribe multiple lines simultaneously in the workpiece. Various embodiments of such beam delivery systems and methods are described in greater detail below.

As used herein, "machining" refers to any act of using laser energy to alter a workpiece and "scribing" refers to the act of machining a line on a workpiece by moving the laser and/or the workpiece linearly. Machining may include, without limitation, laser ablation scribing where the laser energy causes the material of the workpiece to ablate, laser recrystallization scribing where the laser energy causes the material of the workpiece to melt and recrystallize, and laser stealth scribing where the laser energy focused internally in the workpiece causes the workpiece to crack internally. As used herein, "flat" means having little curvature but not necessarily planar. As used herein, terms such as "substantially," "about," and "approximately" mean within acceptable tolerances. Various components of the laser machining systems described herein may also be used in systems for machining workpieces having other shapes.

Figure 1:
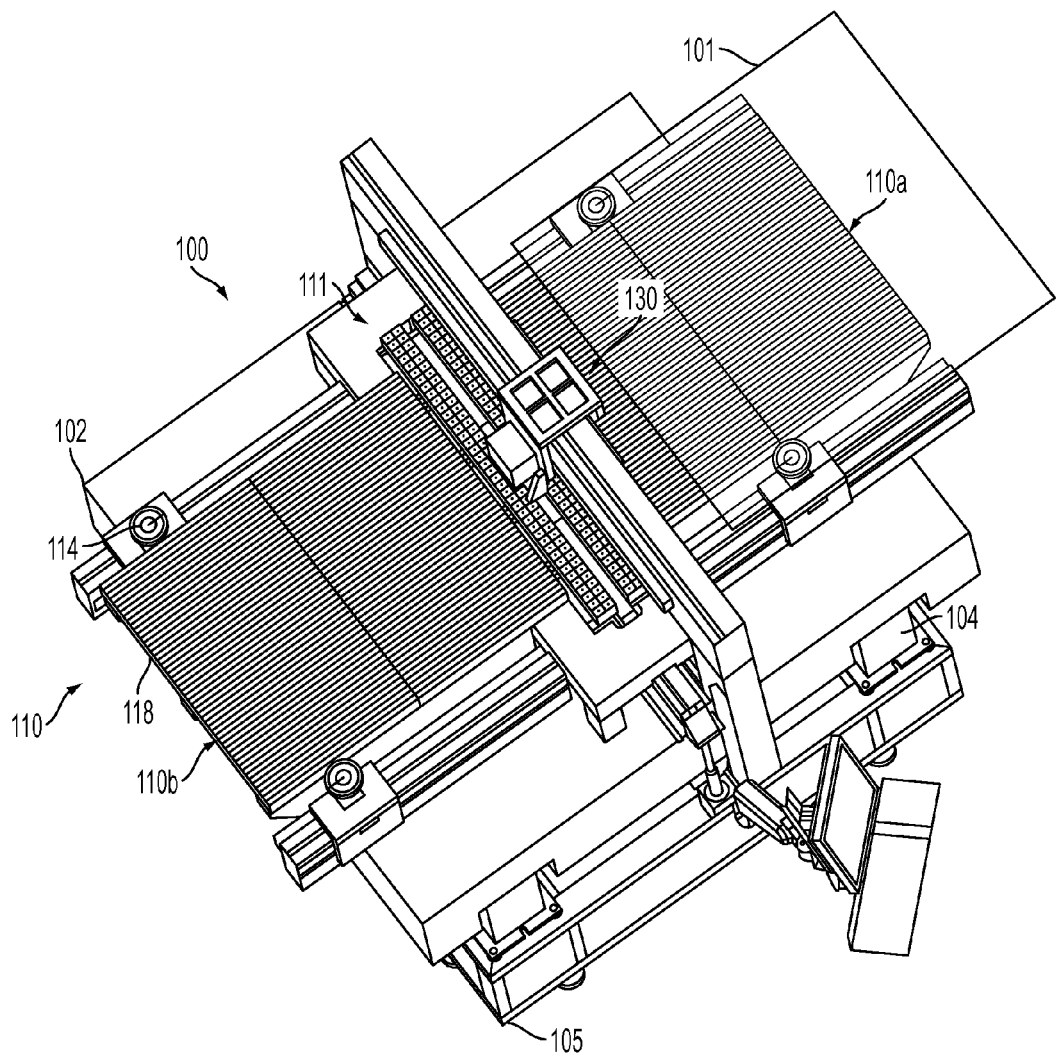
FIG. 1 is a top perspective view of a laser machining system, consistent with an embodiment.
Figure 2:
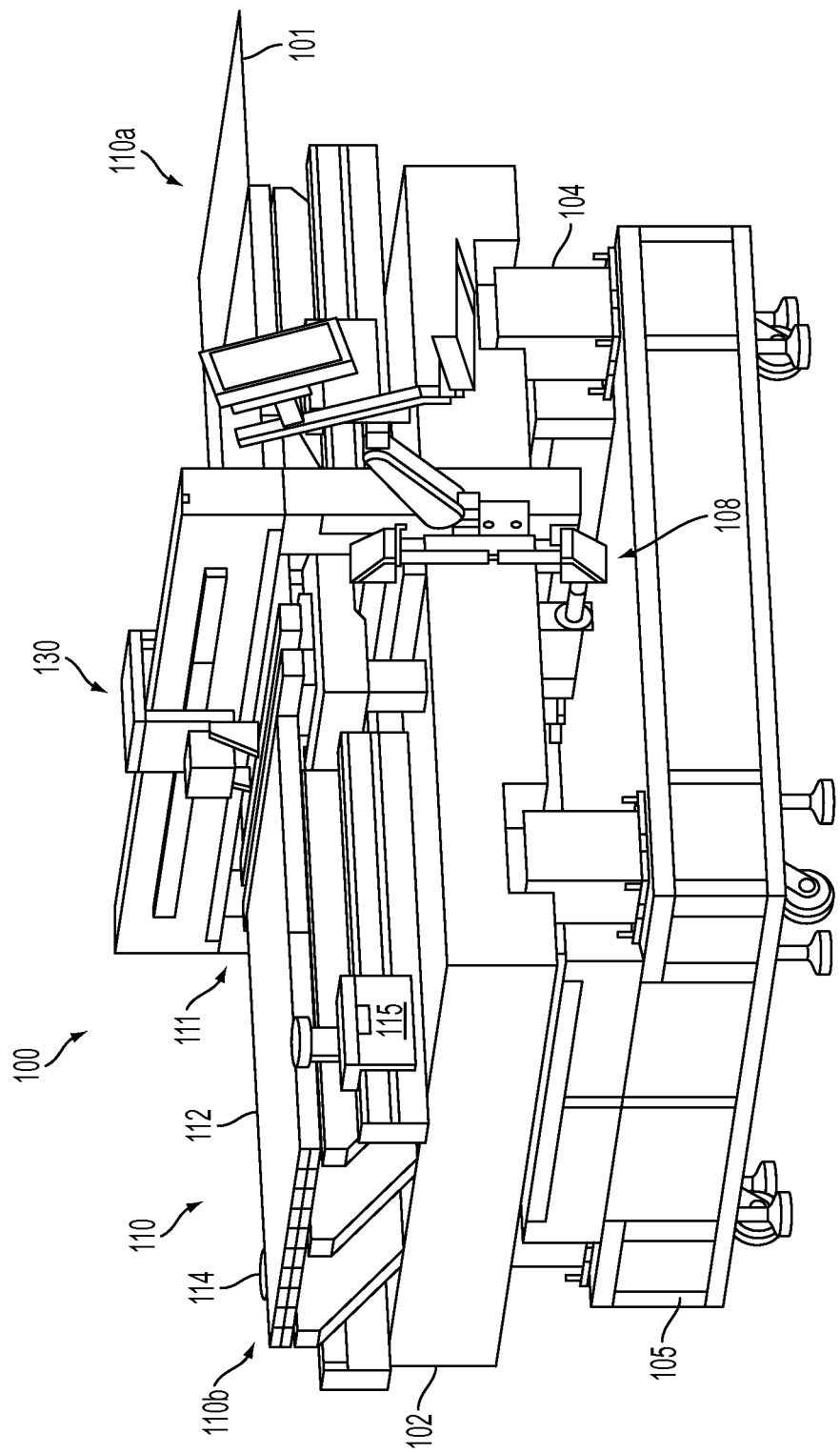
FIG. 2 is a partially cross-sectional perspective view of the laser machining system shown in FIG. 2 taken along an X axis.
Figure 3:
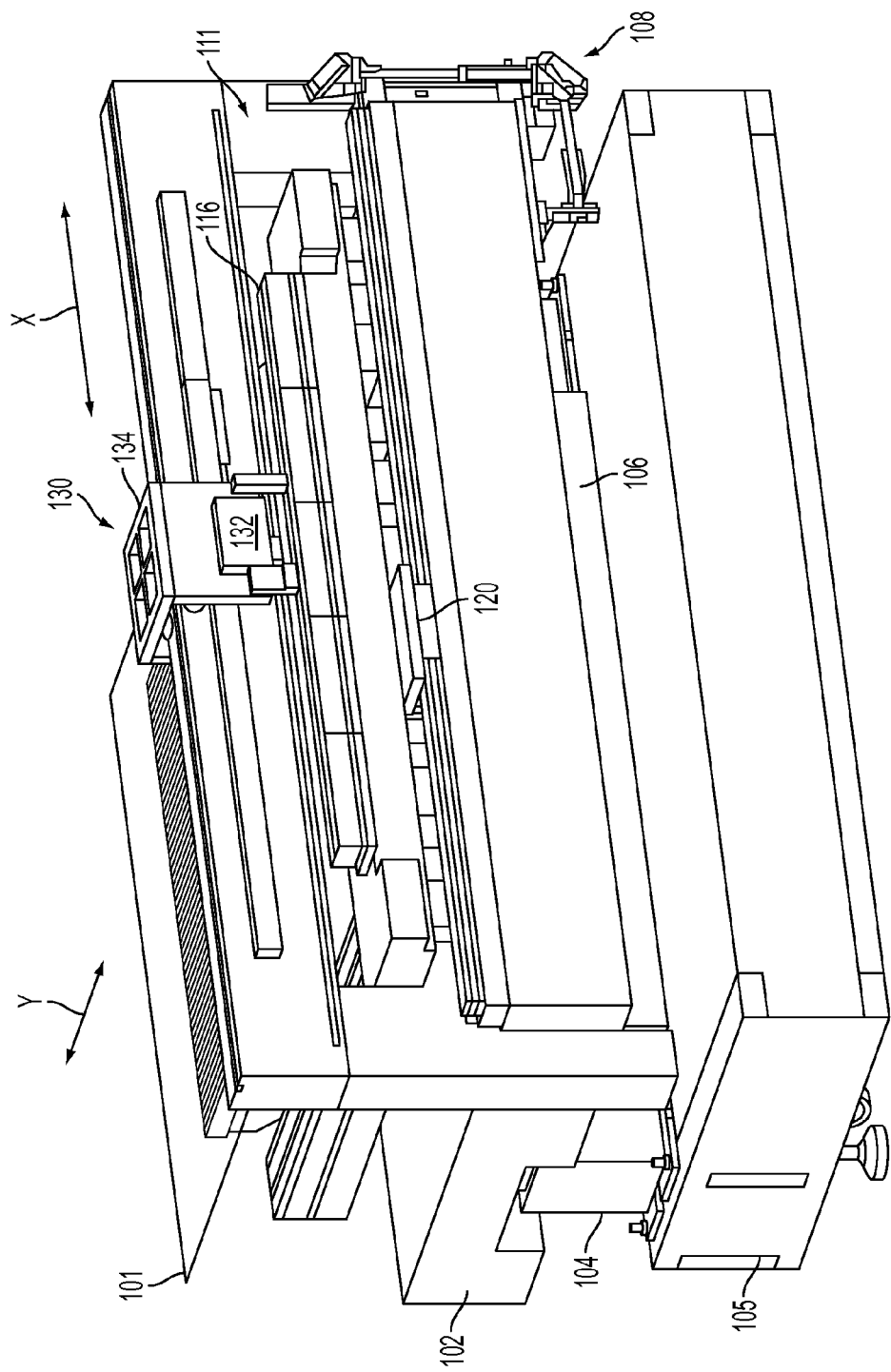
FIG. 3 is a partially cross-sectional perspective view of the laser machining system shown in FIG. 2 taken along a Z axis.

Referring to FIGS. 1-3, one embodiment of a laser machining system 100 is shown and described, which may include a multiple beamlet laser beam delivery system. The laser machining system 100 may include a base 102, such as a granite base, which is supported by a passive vibration isolation system 104. The base 102 may support and provide stability for various components of the laser machining system 100, such as a part handling system, optical heads, motion stages, and motion control systems, as described in greater detail below. The passive vibration isolation system 104 may include four passive isolators at each corner of the base 102 to isolate the laser machining system 100 from vibrations that may travel along the floor. In the illustrated embodiment, the isolators are positioned between the base 102 and a frame 105.

The laser machining system 100 may include a part handling system 110 for supporting a part or workpiece 101 and one or more laser scanning stages 120 supporting one or more optical heads (not shown) that direct one or more laser beams at the workpiece 101. The part handling system 110 may include an infeed section 110a and an outfeed section 110b on opposite sides of a process section 111. The part handling system 110 provides a workpiece support surface 112 for supporting the workpiece 101 and includes a motion control system for controlling motion of the workpiece along a workpiece axis (e.g., Y axis), for example, to index the workpiece 101 through the process section 111. In particular, the infeed section 110a may include an infeed conveyor and the outfeed section 110b may include an outfeed conveyor. The infeed section 110a moves the workpiece 101 into the process section 111 and the outfeed section 110b moves the workpiece 101 out of the process section 111.

In one embodiment, the part handling system 110 and workpiece support surface 112 may be capable of handling and supporting large panels (e.g., 1 m or greater across), such as the type used in thin film solar panels. One embodiment of the part handling system 110 may include one or more vacuum pucks or grippers 114 to hold the workpiece 101 (e.g., large glass panels of a solar panel) and positioning stage(s) to move the grippers 114. One or more of the vacuum grippers 114 may be mounted on an air bearing carriage 115 and may be independently controlled by an air bearing system to allow rotational control of the workpiece 101 for precision alignment. A stationary vacuum puck 116 may also hold the workpiece 101 in position during scribing in the process section 111. An air bearing conveyor 118 may also be used to provide high speed indexing of the workpiece 101 during processing.

In the process section 111, the laser scanning stage(s) 120 may be coupled to a laser scanning stage motion control system for moving the laser scanning stage(s) 120 linearly along one or more scanning axes (e.g., X axis). The scanning stage 120 (and optical head) may be positioned below the workpiece support surface 112 (and thus under the workpiece 101) such that the optical head directs the beam(s) upwardly at the workpiece 101 while the scanning stage 120 moves linearly along the scanning axis. The scanning stage 120 and motion control system may include a high speed precision air bearing system, for example, capable of speeds up to about 2.5 m/sec or greater. A force cancellation technique or mechanism may be used to cancel or minimize reaction forces caused by the movement of the scanning stage(s) 120 and optical head(s). Examples of force cancellation techniques and mechanisms that may be used are described in greater detail in U.S. patent application Ser. No. 12/576,497 entitled LASER MACHINING SYSTEMS AND METHODS WITH MOVING LASER SCANNING STAGE(S) PROVIDING FORCE CANCELLATION, which is filed concurrently herewith and fully incorporated herein by reference.

The laser machining system 100 also includes one or more laser sources 106 that generate one or more raw laser beams and a beam delivery system that modifies and routes laser beam(s) to the workpiece 101. The laser wavelength may be selected based on the layer and type of material to be scribed and may include, for example, wavelengths of 1064 nm, 352 nm, 355 nm, or 266 nm. The laser source(s) 106 may be located below the base 102 and may be mounted on a fast access service module to minimize down time during service intervals. The beam delivery system may modify the beam by controlling the shape, size, uniformity and/or strength of the beam that is routed to the workpiece 101.

The beam delivery system may include a stationary segment 108 located on the frame 105 and/or base 102 and a movable segment located on or in the moveable optical head (not shown) on the laser scanning stage(s) 120. The stationary segment 108 of the beam delivery system may include, for example, a series of lenses, mirrors and/or reflectors, used to direct the laser beam(s) from the laser source 106 into the movable segment of the beam delivery system. The minors or reflectors in the stationary segment 108 of the beam delivery system may be fast steering mirrors that are capable of changing the direction of the beam(s) directed into the optical heads, which may be used for beam tracking and/or for locking the laser to improve pointing stability.

The stationary segment 108 of the beam delivery system may also include a beam expander for expanding the beam and a power meter for measuring a power of the beam. The beam expander can change both the shape and the size of the beam and may include an arrangement of spherical lenses that allow for independent adjustment of both beam expansion ratio and divergence compensation. The power meter may be retractable, for example, using a pneumatic actuator, such that the power meter may be moved into the path of the beam to measure power readings. A retractable beam stop may also be moved into and out of the beam path (e.g., using pneumatic actuator). The retractable beam stop may include a mirror that redirects the beam into a water cooled beam dump to prevent the beam from passing into the optical head.

As will be described in greater detail below, the moveable segment of the beam delivery system receives a laser beam, modifies the laser beam, and directs one or more modified laser beams to the workpiece. In one embodiment, the beam delivery system splits a beam into multiple beamlets to scribe multiple lines simultaneously to get a higher throughput and uses homogenizers and/or imaging optics to make the beam less sensitive to angular pointing instability and to improve accuracy.

The laser machining system may also include a debris control system 130 for collecting and removing debris generated by machining the workpiece 101. In particular, the debris control system 130 may remove debris generated from scribing toxic materials, such as GaAs, and other materials used in thin film solar panels. The debris control system 130 may include a movable debris collection module or head 132 mounted on a debris control motion stage 134 above the workpiece support surface for linear movement with the laser scanning stage 120 and optical head. The debris control motion stage 134 may be controlled by a motion control system and slaved to the motion of the scanning stage 120. In particular, the debris control motion stage 134 may be an air bearing linear motor driven stage.

The laser machining system 100 may further include air filtration systems and outgassing systems to filter and recycle air within the enclosure. An enclosure (not shown) may be located around the laser machining system 100 and air filtration systems (not shown) may be located on the enclosure. The air filtration systems filter the air to remove harmful gases and direct the filtered air back into the processing area within the enclosure. Examples of debris control and extraction systems and methods that may be used are described in greater detail in U.S. patent application Ser. No. 12/576,963 entitled LASER MACHINING SYSTEMS AND METHODS WITH DEBRIS EXTRACTION, which is filed concurrently herewith and fully incorporated herein by reference.

The laser machining system 100 may also include tracking systems and/or vision inspection systems (not shown) for precision alignment of the workpiece prior to scribing and/or for tracking and/or inspection during and/or after scribing. One or more sensors or inspection cameras may be mounted on the debris control motion stage 134 or another motion stage that moves with the laser scanning stage 120. The laser machining system may also include computerized control systems including control software that integrates the laser, motion control, digital input/output, tracking, and optional machine vision inspection. Examples of tracking and vision correction systems and methods that may be used are described in greater detail in U.S. patent application Ser. No. 12/576,508 entitled LASER MACHINING SYSTEMS AND METHODS WITH VISION CORRECTION AND/OR TRACKING, which is filed concurrently herewith and fully incorporated herein by reference.

Figure 4A:
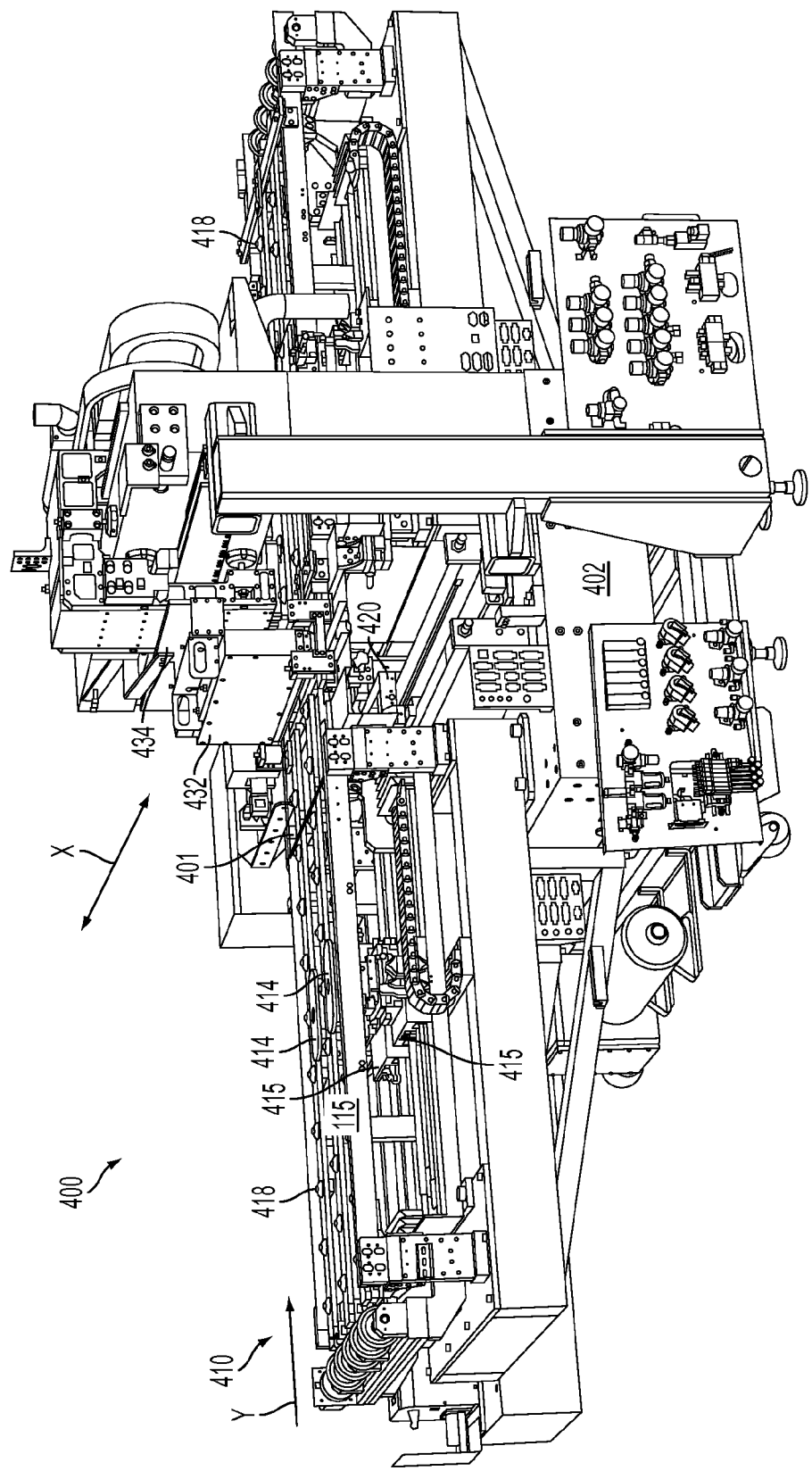
FIGS. 4A and 4B are front and back perspective views of a laser machining system, consistent with another embodiment.
Figure 4B:
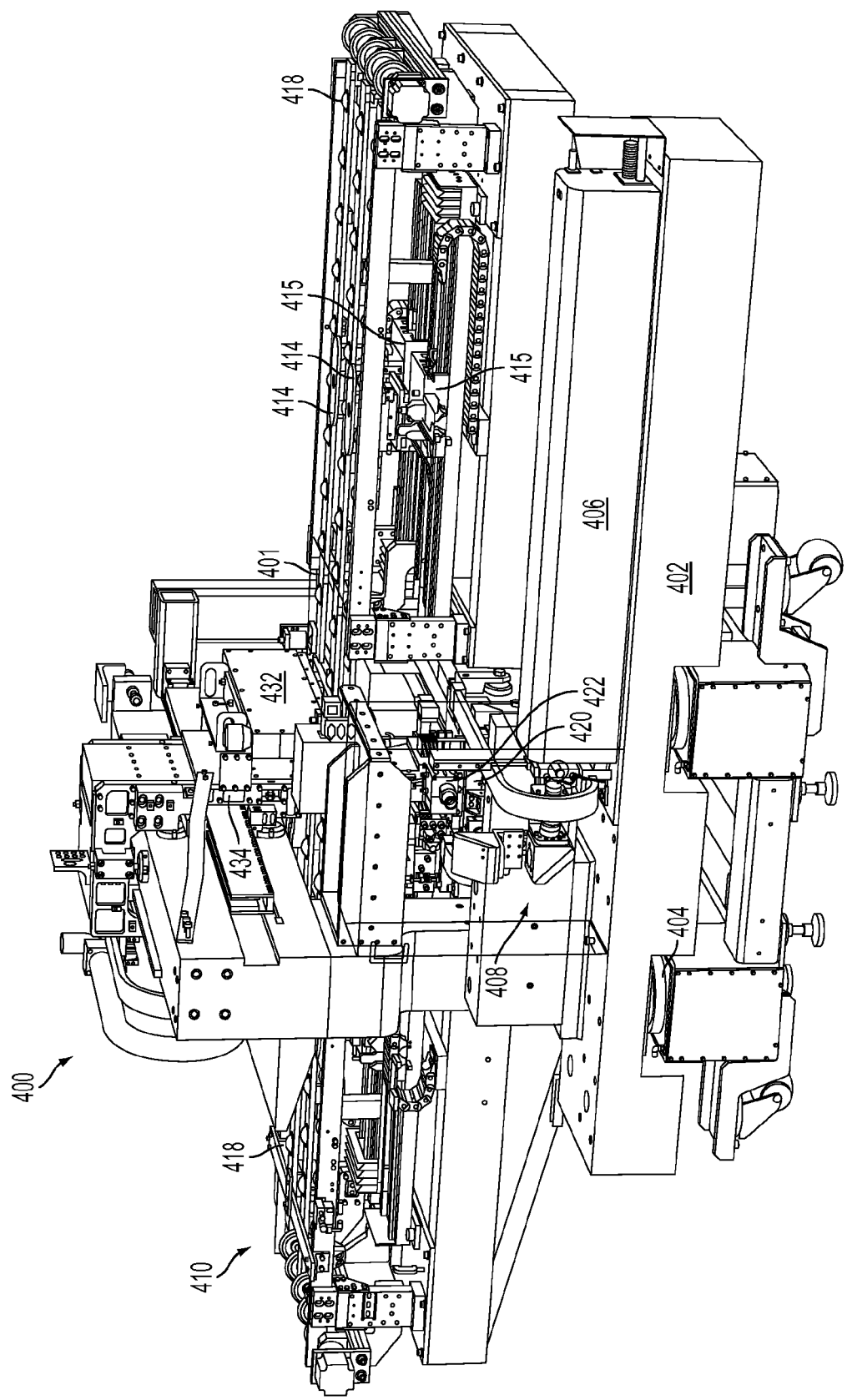

Referring to FIGS. 4A and 4B, another embodiment of a laser machining system 400 is shown and described. The laser machining system 400 may include a base 402 supported by passive vibration isolators 404. The base 402 may support and provide stability for various components of the laser machining system 400, such as a part handling system, optical heads, motion stages, and motion control systems.

In this embodiment, the part handling system 410 for supporting and moving the workpiece 401 includes vacuum grippers 414 for gripping the workpiece 401 and rollers 418 for supporting the workpiece 401. The vacuum grippers 414 are supported on motion stages 415 capable of moving the workpiece 401 along the indexing axis (i.e., the Y axis) to index the workpiece 401 through the processing section. The motion stages 415 may also move the grippers 414 along the scanning axis (i.e., the X axis), for example, to rotate the workpiece 401.

This embodiment of the laser machining system 400 includes a laser scanning stage 420 and optical head 422 located below the workpiece 401 for movement along the scanning axis. A laser source 406 mounted on the base 402 generates a laser beam, and a stationary beam delivery system 408 delivers the beam into the moving optical head 422.

This embodiment of the laser machining system 400 further includes a debris collection hood 432 mounted on the top side opposite the optical head 422. The debris collection hood 432 is fixed and extends across the width of the workpiece 401 to collect debris from the top side of the workpiece 401 as the optical head 422 scans and machines the workpiece 401 from the bottom side.

The laser machining system 400 also includes a scanning stage 434 positioned above the workpiece 401, which allows the system 400 to be retrofitted for top side machining. For example, the optical head may be mounted on the scanning stage 434 and directed downward toward the workpiece 401. In a top side machining configuration, a moving debris collection hood may be mounted on the top side for movement with the optical head such that the debris is extracted as the workpiece is machined. FIGS. 4A and 4B show the system 400 configured for bottom side machining and thus the top side scanning stage 434 is fixed.

Figure 5A:
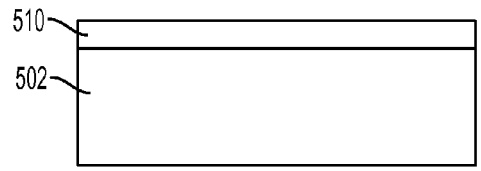
FIGS. 5A-5F are schematic side views illustrating the formation of lines in different layers of a thin film photovoltaic solar panel, consistent with an embodiment.
Figure 5B:
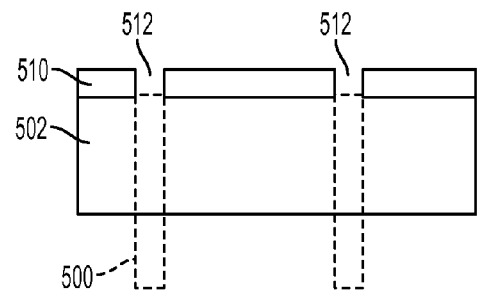

The laser machining system 100 may be used to scribe lines in large panels such as solar panels. Referring to FIGS. 5A-5F, one method of scribing lines in a thin film photovoltaic (PV) solar panel is described in greater detail. A first (P1) layer of conductive material 510 may be deposited on a substrate 502, such as glass or polyethylene terephthalate (PET) (FIG. 5A). The first layer 510 of conductive material may include a transparent conductive oxide including, but not limited to, indium tin oxide (ITO), indium zinc oxide (IZO), tin oxide (SnO) or zinc oxide (ZnO). The first layer 510 may then be scribed by directing one or more laser beams 500 through the substrate 502 to the first layer 510 to ablate a portion of the first layer 510 and form one or more scribe P1 scribe lines 512 (FIG. 5B). The scribe lines 512 may be spaced, for example, about 5-10 mm apart. The laser beam(s) 500 may have a wavelength (e.g., 1064 nm) and energy density sufficient to ablate the P1 layer 510 without damaging the substrate 502.

Figure 5C:
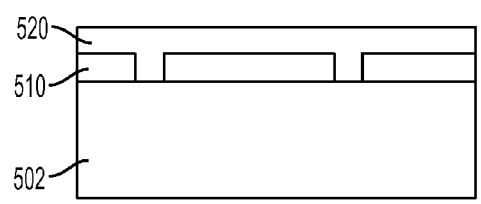
Figure 5D:
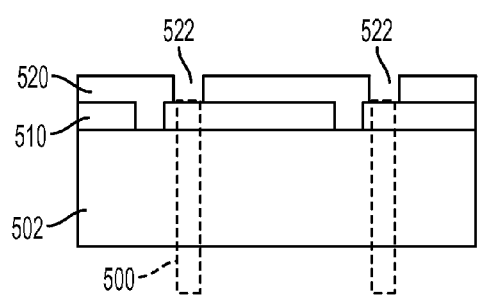

A second (P2) layer 520 of an active semiconductor material may then be deposited on the first layer 510 and within the P1 scribe lines 512 formed in the first layer 510 (FIG. 5C). The semiconductor material of the second layer 520 may include, without limitation, amorphous silicon (aSi), cadmium telluride (CdTe), copper indium gallium diselenide (CIGS), or copper indium diselenide (CIS). The second layer 520 may then be scribed by directing one or more laser beams 500 through the substrate 502 and the first layer 510 to the second layer 520 to ablate a portion of the second layer 520 and form P2 scribe lines 522 (FIG. 5D). The laser beam(s) 500 may have a wavelength (e.g., 532 nm) and energy density sufficient to ablate the P2 layer 520 without damaging the substrate 502 and the P1 layer 510.

Figure 5E:
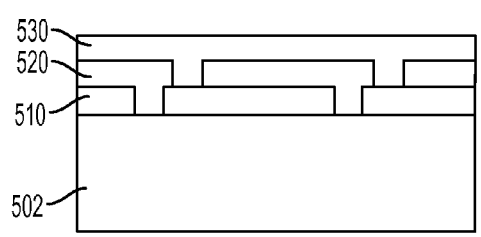
Figure 5F:
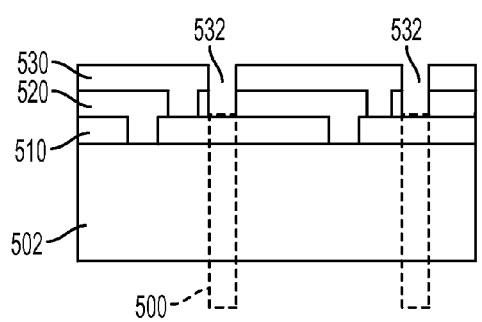

A third (P3) layer 530 of a metal may then be deposited on the second layer 520 and in the P2 scribe lines 522 formed in the second layer 520 (FIG. 5E). The conductive material of the third layer 530 may include a metal including, but not limited to, aluminum (Al), molybdenum, Mo, silver (Ag), or chromium (Cr). The second and third layers 520, 530 may then be scribed by directing one or more laser beams 500 through the substrate 502 to the second layer 520 and third layer 530 to ablate a portion of the second and third layers 520, 530 and form P3 scribe lines 532 (FIG. 5F). The laser beam(s) 500 may have a wavelength (e.g., 532 nm) and energy density sufficient to ablate the P2 and P3 layers 520, 530 without damaging the substrate 502 and the P1 layer 510.

The area with the lines 512, 522, 532 scribed in the P1-P3 layers 510, 520, 530 does not contribute toward solar energy conversion and is often referred to as a wasted or dead area. The lines 512, 522, 532 should be scribed and aligned accurately to minimize this dead area and provide the best efficiency of the solar panel. Embodiments of the laser machining system and method described herein are capable of forming the laser beams 500, directing laser beams 500 up through the substrate, and moving or scanning the beams 500 across the substrate to form the scribe lines 512, 522, 532 accurately. Embodiments of the laser machining system and method described herein may also be used to scribe the lines 512, 522, 532 from the top or film side by moving or scanning beams directed at the layers 510, 520, 530. In particular, the optical head and beam delivery systems described herein are capable of scanning multiple uniform beamlets with minimal wandering, thereby forming multiple scribe lines simultaneously and accurately.

Referring to FIGS. 6-16, various embodiments of a moving optical head and multiple beamlet laser beam delivery system are described in greater detail. The moving optical head including the multiple beamlet laser beam delivery system may be mounted on a scanning stage that moves linearly along the scanning axis (e.g. along the X axis), for example, as described above. The moving optical head may also be mounted on a manual or motorized stage for adjustment across the scanning axis (e.g., along the Y axis). Although the moving optical head is mounted on a laser scanning stage in the exemplary embodiments described herein, the multiple beamlet laser beam delivery system and the concepts described herein may be applicable to other beam delivery systems, for example, in stationary optical heads.

Figure 6A:
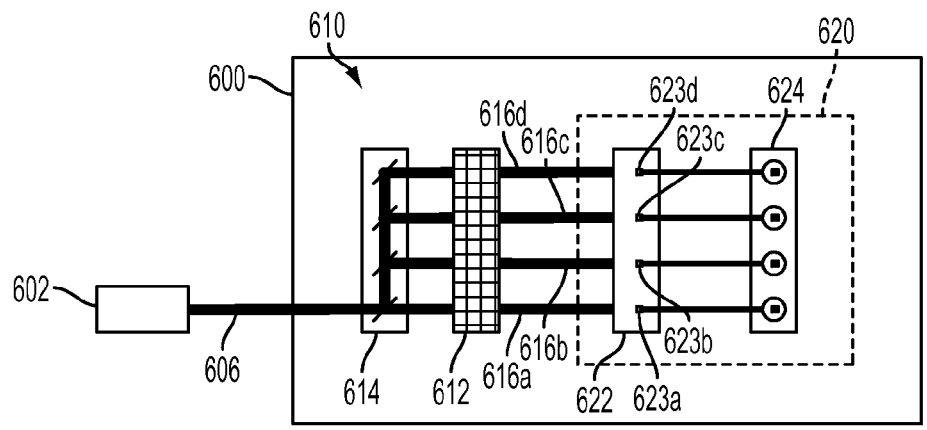
FIGS. 6A and 6B are schematic views of embodiments of movable optical heads including multiple beamlet laser beam delivery systems that split a laser beam before a mask projection.
Figure 6B:
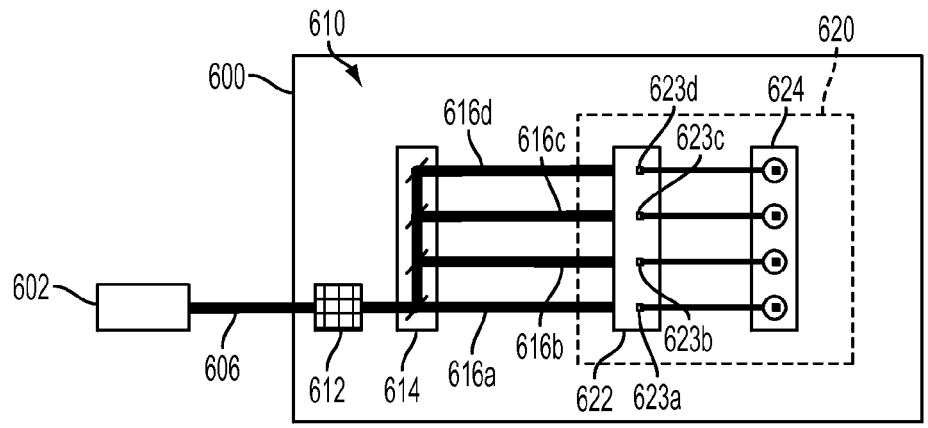

As shown in FIGS. 6A and 6B, a moving optical head 600 may include a beam delivery system 610 that splits a laser beam 606 from a laser source 602 into multiple beamlets 616a-616d and images the beamlets 616a-616d onto a workpiece (not shown). A stationary beam delivery system (not shown) may deliver the laser beam 606 from the laser source 602 to the moving optical head 600. The beam delivery system 610 may include a beam homogenizer 612, a beam splitter 614, and an imaging section 620. Using the imaging section 620 to provide near field imaging of the beamlets 616a-616d onto the workpiece improves laser pointing stability.

The beam splitter 614 may include a series of partially reflecting minors and a minor, such as the type generally known to those skilled in the art. The laser beam 606 may be split such that the beamlets 616a-616d have substantially equal path length and pulse energy. The beam homogenizer 612 may be positioned after the beam splitter 614 to homogenize the multiple beamlets 616a-616d (FIG. 6A) or may be positioned before the beam splitter 614 to homogenize the single laser beam 606 directed into the optical head (FIG. 6B). The beam homogenizer 612 may be a monolithic beam homogenizer element that receives and homogenizes the beam 606 or each of the beamlets 616a-616d. One example of a beam homogenizer includes a fly eye beam homogenizer known to those skilled in the art.

Figure 7:
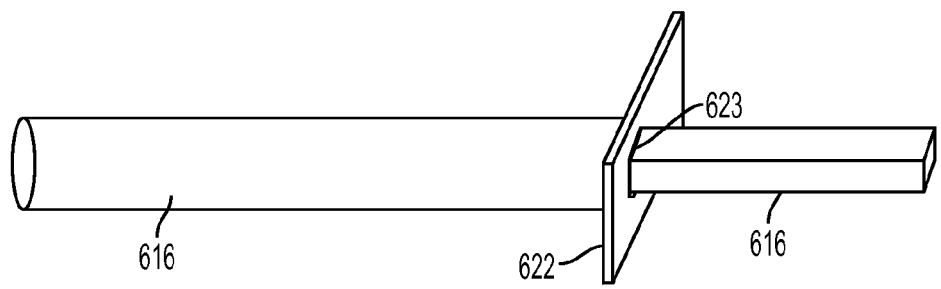
FIG. 7 is a schematic perspective view of an embodiment of a mask imaging a laser beam with a rectangular profile.

The imaging section 620 may include a mask 622 to shape the beamlets 616a-616d and imaging optics 624, such as an objective lens array, to focus the imaged beamlets, thereby providing near field imaging. The mask 622 is back illuminated by the beamlets 616a-616d and includes apertures 623a-623d for receiving each of the beamlets respectively and for shaping the beamlets to a desired imaging profile. To achieve a desired imaging profile for scribing thin film layers in a solar panel, for example, the apertures 623a-623d may have polygon shapes such as a rectangle, square, triangle, or hexagon. FIG. 7 shows a beamlet 616 with a round cross-section being directed at one rectangular-shaped aperture 623 of the mask 622 and a rectangular-shaped portion of the beamlet 616 being projected from the mask 622.

Figure 8:
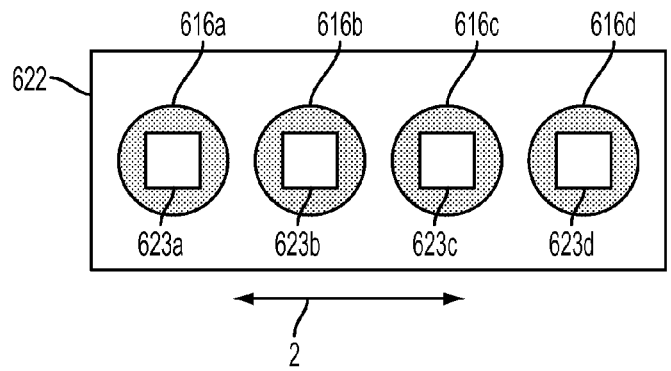
FIG. 8 is a schematic front view of an embodiment of a mask that is overfilled with a plurality of beamlets.

In one embodiment, the mask 622 is mounted to a mask translation stage for translating the mask and adjusting the position of the beamlets 616a-616d, for example, to provide scribe line tracking. As shown in FIG. 8, the beamlets 616a-616d may overfill the mask 622 to reduce pointing error and to allow the mask 622 to be translated, for example, in the direction of arrow 2. Translation of the mask 622 results in a lateral shift of the beamlets 616a-616d, for example, to adjust a position of the beamlets 616a-616d on the workpiece. The degree of overfilling the mask 622 may depend on the desired extent of the shift in the beamlets. In one embodiment, for example, each of the beamlets 616a-616d may overfill the mask 622 by about 50% to 75% and more particularly about 70% to 75% (i.e., about 25% to 30% of the beam is utilized). The degree of overfill may vary between about 10% to 90% depending upon the type of laser source and/or the process. For processes in which more beam uniformity is desired, for example, a smaller portion of the beam should be used and overfill may be greater. For laser beams with a top hat profile (e.g., homogenized beams or beams with higher $M^2$ values), more of the beam may be used and the overfill may be less.

Figure 9:
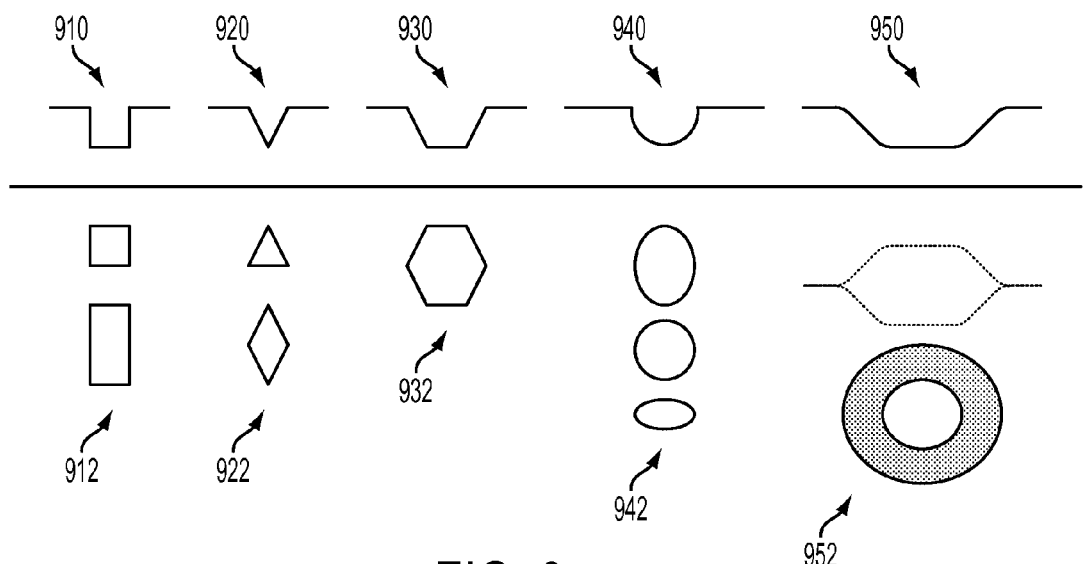
FIG. 9 is an illustration of different cross-sectional shapes of scribes and corresponding mask aperture shapes used to produce the scribes, consistent with different embodiments.

Referring to FIG. 9, various mask aperture shapes and/or apodization techniques may be used to shape the beamlets to provide scribes having corresponding cross-sectional shapes and to provide various edge effects such as feathered edges. For example, a scribe 910 with a rectangular cross-section may be produced by square or rectangular shaped mask apertures 912. A scribe 920 with a V-shape may be produced by triangular or diamond shaped mask apertures 922. A scribe 930 with a flat bottom and angled walls may be produced by a hexagonal shaped mask aperture 932. A scribe 940 with rounded walls may be produced by oval or circular shaped mask apertures 942. A scribe 950 with feathered edges may be produced using apodization techniques or mask apertures 952 with gray scale edges. The different shapes provide different overlapping when scanned across a workpiece, thereby creating different effects such as feathering. Masks or apertures may also be rotated to provide different effects or to compensate for rotation of the beam imaged on the workpiece. Using different mask shapes may avoid undesirable laser machining effects and may help achieve cleaner scribes.

Figure 10:
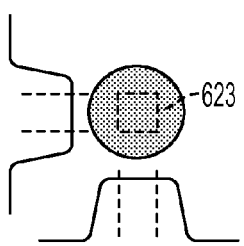
FIG. 10 is a diagrammatic view of a laser beam with a top hat profile.

As shown in FIG. 10, the laser beam may be a noncoherent beam having a top hat profile. Overfilling the mask aperture 623 with the top hat beam improves beam utilization and uniformity and reduces beam pointing instability. As used herein, "noncoherent" refers to a laser beam that does not have perfect spatial or temporal coherence. Noncoherent laser beams do not produce undesirable interference effects when passing through fly eye homogenizers or other types of beam homogenizers. According to one embodiment, the laser source 602 may include a multimode laser that provides a multimode laser beam that has a $M^2$ factor greater than 1 and more particularly between 5 and 25. According to another embodiment, the laser source 602 may include a singe mode laser ($M^2$=1) that generates a coherent Gaussian laser beam and may further include a coherence scrambler (not shown) to provide the noncoherent beam with a top hat profile. Examples of coherence scramblers include noncoherent optical fiber scramblers, light pipes, optical kaleidoscopes, and multichannel phase retardation plates. Noncoherent beams have higher power for the same input power and may be more desirable for homogenizing, overfilling the mask 622 and/or shaping into the desired imaging profile. The use of a noncoherent beam (i.e., a multimode laser with $M^2$ greater than 5) is facilitated by using a near field imaging technique in which image accuracy is not as dependent upon laser pointing (e.g., as compared to a far field technique in which the focal point of the beam is used and pointing shows up at the focus of the lens).

The laser source 602 may be chosen to provide selective material removal without being destructive to other layers or the substrate. As discussed above, for example, the second (P2) layer should be selectively removed without damaging the first (P1) layer. In particular, the wavelength of the laser may vary depending upon the characteristics of the material being removed. The pulse width may also vary depending upon the type and thickness of material and may generally range between about 5 ps (or less) and about 500 ns (or less) and the frequency may be in the range of about 30 kHz to 1 MHz. The use of ultra fast and subpicosecond provide a precise material removal rate and allow depth control, for example, when scribing the P2 and P3 lasers described above.

Figure 11:
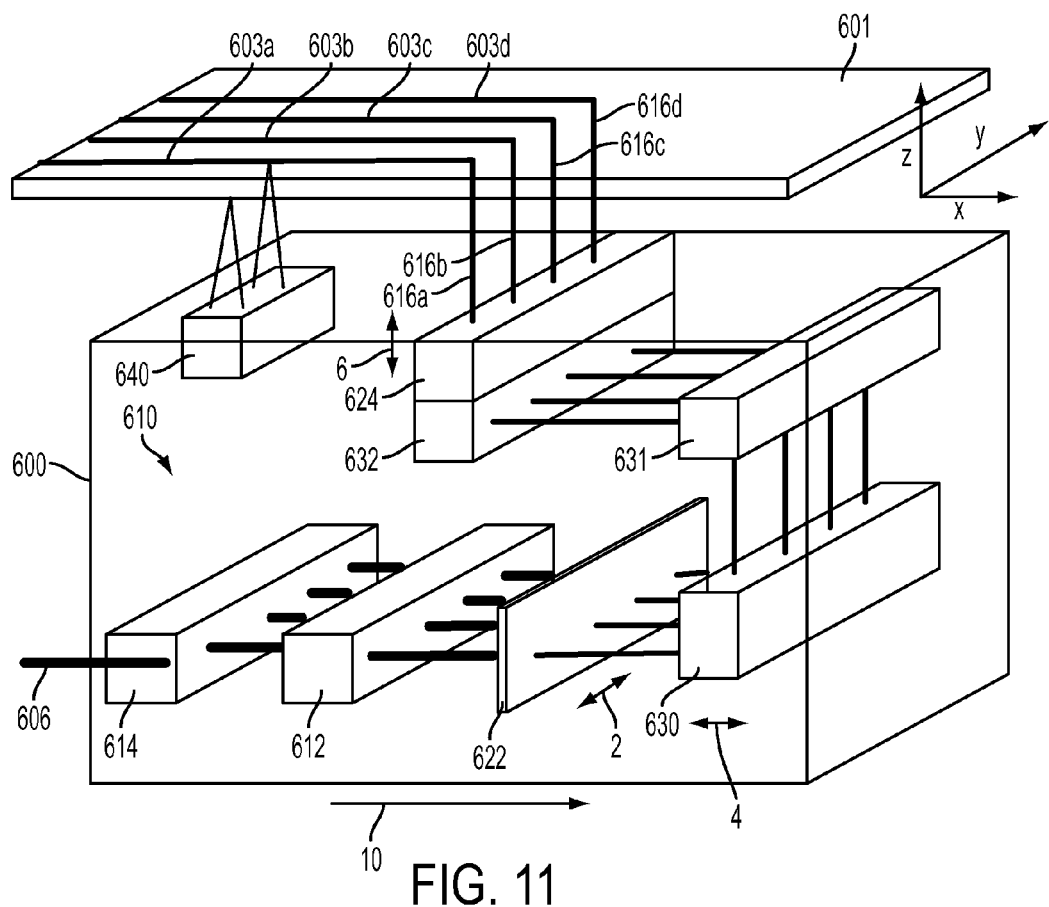
FIG. 11 is a schematic perspective view of an embodiment of a movable optical head including a multiple beamlet laser beam delivery system that splits a beam before a mask projection.
Figure 12:
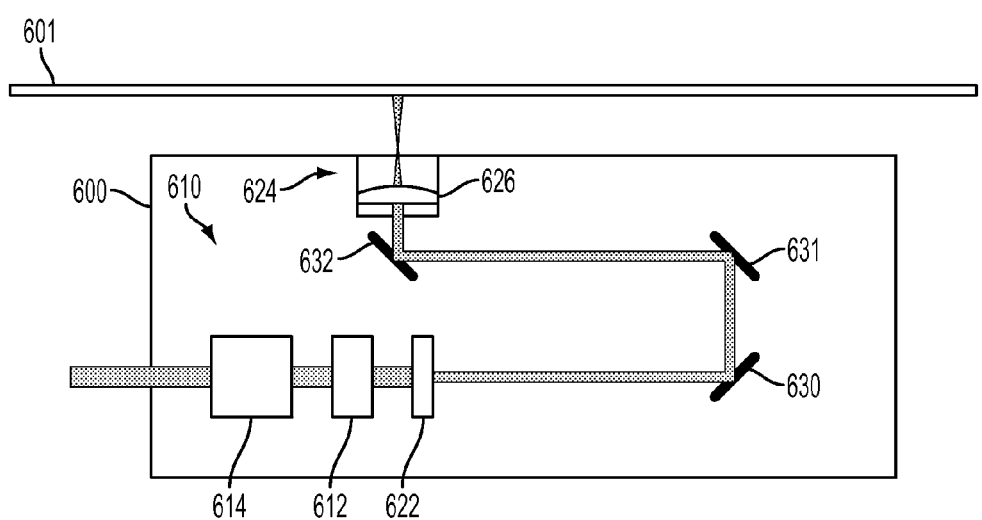
FIG. 12 is a schematic side view of the beam delivery system shown in FIG. 11.

As shown in FIGS. 11 and 12, the optical head 600 is moved linearly (e.g., in the direction of arrow 10) such that the beamlets 616a-616d directed at a workpiece 601 form scribe lines 603a-603d along the workpiece 601 as the optical head moves. The optical head 600 may be mounted, for example, on a laser scanning stage that moves in both directions along a scanning axis (e.g., the X axis), as described above. The optical head 600 The laser beam 606 is directed into the optical head 600 substantially parallel to the linear axis of motion (i.e., the scanning axis) and the multiple beamlets 616a-616d are directed out of the optical head 600 substantially orthogonal to the linear axis of motion. As such, the laser beam 606 and/or multiple beamlets 616a-616d may be redirected within the optical head 600, for example, using one or more reflectors or mirrors.

In the illustrated embodiment, the beam delivery system 610 includes beam directing minors 630-632 for directing the shaped beamlets from the mask 622 to respective lenses 626 in the imaging optics 624. The beam directing mirrors 630, 631 may be mounted on a minor translation stage to translate the beam directing mirrors 630, 631 and change the distance from the mask 622 to the imaging optics 624, for example, to provide magnification tracking. The lenses 626 in the imaging optics 624 image the shaped beamlets onto the scribing location on the workpiece 601 to scribe the workpiece 601 as the optical head 600 moves. In one embodiment, the array of lenses 626 is mounted on a lens array motion stage (not shown) for moving the lens array and adjusting the focus to provide height tracking.

The beam delivery system 620 thus provides various ways of adjusting the beamlets 616a-616d on the workpiece 601. The mask 622 may be moved orthogonal to the axes of the beamlets 616a-616d (i.e., in direction of arrow 2) to provide a lateral shift of the beamlets on the workpiece 601 and thus a lateral shift of the scribe lines 603a-603d. One or more of the minors 630, 631 may be moved along an axis of the beamlets (i.e., in the direction of arrow 4) to change the distance from the mask 622 to the imaging optics 624 for one or more of the beamlets 616a-616d (i.e., the beam length). The imaging optics 624 or one or more of the lenses 626 within the imaging optics 624 may be moved along an axis of the beamlets (i.e., in the direction of arrow 6) to change the focus or size of the beam spot imaged on the workpiece 601.

Although one particular configuration is shown, other configurations of the beam delivery system 610 are possible to achieve the formation and redirection of multiple beamlets within the moving optical head. For example, the beam 606 may be reflected and directed orthogonal to the axis of motion (i.e., the X axis) before splitting the beam 606 into the multiple beamlets 616a-616d.

The optical head 600 may also include one or more sensors 640 for sensing a workpiece position, a scribe line position, or other conditions as the optical head 600 is scanning. The sensor(s) 640 may include, for example, a position sensor that senses a position of a scribe line and/or surfaces of the workpiece 601 to provide scribe line tracking and/or workpiece tracking. The sensor 640 may also be located outside of the optical head 600 in other locations on the laser scanning stage (not shown). Sensors or sensing components may also be provided in other locations within a laser machining system.

A laser machining system, consistent with embodiments described herein, may also include one or more tracking systems that track workpiece and/or scribing conditions and adjust scribing parameters in response thereto. The scribe lines 603a-603d may be adjusted in response to tracking data, for example, by moving the mask 622, mirrors 630-632 and/or imaging lenses 626 to adjust the beamlets 616a-616d on the workpiece. When scribing lines on large panels, such as solar panels, the process parameters, positional offsets, and other elements, may be varied to provide uniform aligned scribe lines. Uniform scribe lines may have uniform depth, width, heat-affected-zones (HAZ) and penetration into non-scribed layers. To provide uniformity in the scribe lines, the scribing may need to be adjusted to compensate for certain non-uniformities in the workpiece such as the lack of surface flatness, glass thickness and/or coating non-uniformities. Without compensation, variations in the distance from a workpiece to a focusing lens, for example, may cause undesirable scribe variations (e.g., in width and/or fluence).

Further embodiments of a movable optical head 1300 including a beam delivery system 1310 are shown in FIGS. 13-16. Similar to the optical head 600, the optical head 1300 may be moved linearly (e.g., in a direction of arrow 10) such that multiple beamlets 1316a-1316d directed at a workpiece 1301 form scribe lines 1303a-1303d along the workpiece 1301. Thus, a laser beam 1306 is directed into the optical head 1300 substantially parallel to the linear axis of motion and the multiple beamlets 1316a-1316d are directed out of the optical head 1300 substantially orthogonal to the linear axis of motion. The laser beam 1306 may be generated by a laser source and directed into the optical head 1300 by a stationary beam delivery system, for example, as described above.

According to these embodiments, the laser beam 1306 may be projected through a mask 1322 before splitting the beam 1306 with a beam splitter 1314 into multiple beamlets 1316a-1316d. The mask 1322 forms a shaped beam according to an aperture shape provided by the mask 1322 and the beam splitter 1314 splits the shaped beam into multiple shaped beamlets 1316a-1316d. Imaging optics 1324 image the shaped beamlets 1316a-1316d onto the workpiece 1301. The beam delivery system 1310 may also include optics 1312 such as a beam expander/reducer telescope and/or beam shaping optics for modifying and/or shaping the laser beam 1306 before the mask 1322. A beam reducer telescope collects and repositions the beam 1306 entering the optical head 1300, which results in a more stable beam due to the demagnification factor. The reduction of the beam 1306 upon entering the optical head 1300 also reduces the effects of scan axis position changes. Beam shaping optics control the shape of the beam 1306, for example, by changing a round beam to an elliptical or line shaped beam. The shape of the beam may be changed using beam shaping optics to change the energy density, for example, to maximize the light efficiency in the mask 1322. A beam coherence scrambler may also be located in the movable optical head 1300.

In one embodiment, the mask 1322 may be capable of adjusting the shape and/or dimensions of the beam projected through the mask 1322, which changes the shape and/or dimension of the beamlets 1316a-1316d. The mask 1322 may adjust the width of the shaped beam, for example, to adjust the width of the scribe lines 1303a-1303d on the workpiece 1301. In one application, for example, the width of the scribe lines 1302a-1302d may be changed between 40 μm and 80 μm. One embodiment of the mask 1322 is a rectangular variable aperture (RVA) mask capable of varying the height and width of a rectangular shaped beam. In one type of RVA mask, micrometers may be used to adjust blades to change the width and/or height of the aperture.

The laser beam 1306 may overfill the mask 1322 as described above to reduce pointing error. Similar to the mask 622 described above, the mask 1322 may be shifted laterally (i.e., orthogonal to the axis of the beam 1306), which shifts the beam 1306, the beamlets 1316a-1316d, and the lines 1303a-1303d scribed on the workpiece 1301. The mask 1322 may also include different shaped apertures, grey scale masks or apodized masks to control the scribe side wall profiles, for example, as shown in FIG. 9 and described above. Other types of masks 1322 may also be used.

The optical head 1300 may also include a homogenizer 1350 in the beam delivery system 1310. In one embodiment, shown in FIG. 14, the beam delivery system 1310 may be configured such that the laser beam 1306 is homogenized in one configuration and is not homogenized in another configuration. For example, retractable reflectors 1352 may be used to redirect the laser beam 1306 through an alternate homogenization path including the homogenizer 1350. In another embodiment, the homogenizer 1350 may be retractable (e.g., using a pneumatic actuator) such that the homogenizer 1350 may be moved into the beam path when homogenization is desired. The combination of a multimode laser and overfilling the mask may avoid the need for homogenizing the beam 1306. The homogenizer may also be eliminated entirely from the beam delivery system in some embodiments.

Figure 14:
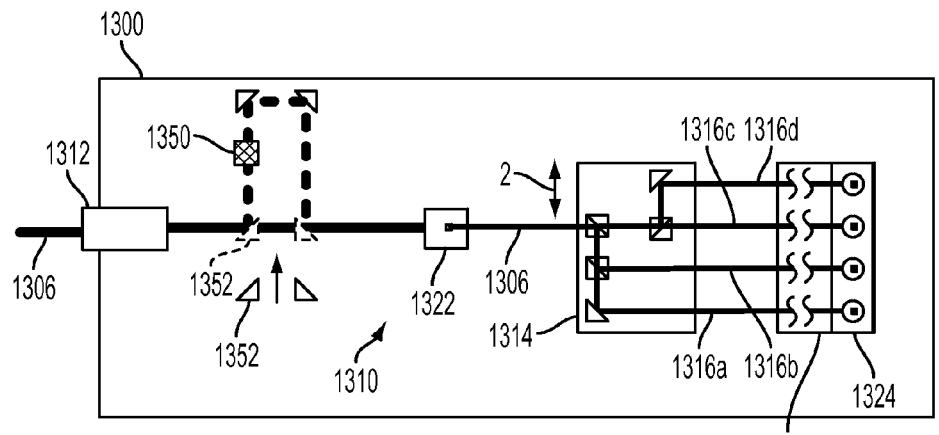
FIG. 14 is a schematic top view of another embodiment of a multiple beamlet laser beam delivery system that splits a beam after a mask projection.

The beam splitter 1314 may include one or more beam splitter cubes and/or reflectors arranged to split the single beam 1306 into the multiple parallel beamlets 1316a-1316d (FIG. 14). The beam splitter 1314 or one or more of the beam splitter cubes and angle reflectors may be movable orthogonal to the beam axis (e.g., in the direction of arrow 2) to shift one or more of the beamlets 1316a-1316d laterally, thereby adjusting the scribe lines 1303a-1303d on the workpiece 1301. Although four beamlets 1316a-1316d are shown, a beam splitter configuration may be used to split the beam 1306 into fewer or greater numbers of beamlets.

The beam delivery system 1310 may also include an optical path length adjustment system 1330 that adjusts a length of the optical path of each of the beamlets 1316a-1316d. In the exemplary embodiment, the beam delivery system 1310 includes reflectors 1332 that reflect the beamlets 1316a-1316d into the optical path length adjustment system 1330, which adjusts the optical path lengths and reflects the beamlets to imaging optics 1324. In one embodiment, for example, the length of one or more of the optical paths of the beamlets 1316a-1316d may be individually adjusted such that all of the optical path lengths are substantially the same. Splitting the beam 1306 results in some of the beamlets 1316a-1316d having different optical path lengths (e.g., the optical path length of the beamlet 1316c is shorter coming out of the beam splitter 1314 than the other beamlets 1316a, 1316b, 1316d). Different lengths of the optical paths may cause inconsistencies in the scribe lines 1303a-1303d on the workpiece 1301 due to differences in demagnification and/or pulse energy on the workpiece 1301. Having substantially the same optical path length for each of the beamlets 1316a-1316d provides consistent demagnification and pulse energy on the workpiece 1301 and thus consistent scribe lines 1303a-1303d.

Figure 15:
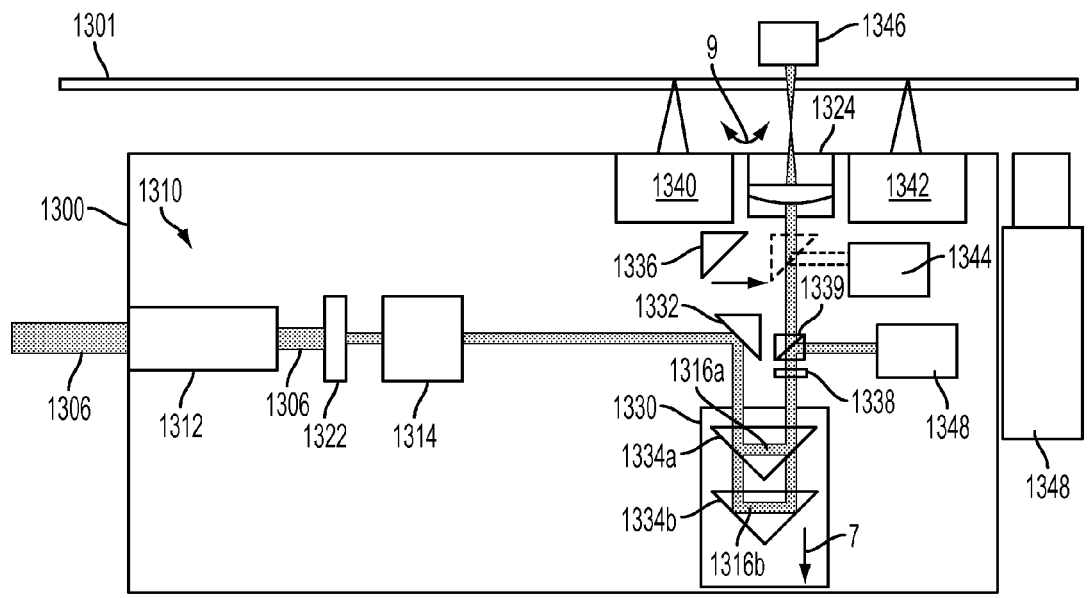
FIG. 15 is a schematic side view of a further embodiment of a movable optical head including a multiple beamlet laser beam delivery system that splits a beam after a mask projection.

In one embodiment, the optical path length adjustment system 1330 includes one or more reflection points that are moveable to change the optical path lengths. By providing different movable reflection points for each of the beamlets 1316a-1316d, the optical path length adjustment system 1330 can independently change the optical path length of each of the beamlets 1316a-1316d. FIG. 15 shows, for example, angle reflectors 1334a, 1334b mounted within the paths of the beamlets 1316a, 1316b for redirecting the beamlets 1316a, 1316b to the imaging optics 1324. If the reflector 1334b is moved in the direction of arrow 7, the length of the optical path for beamlet 1316b may be lengthened. Although two angle reflectors 1334a, 1334b are shown, angle reflectors may be slidably mounted within the paths of each of the beamlets 1316a-1316d. The angle reflectors may be mounted such that the reflectors slide linearly and may be fixed into a desired position providing the desired optical path lengths. The optical path length adjustment system 1330 may also include other configurations of movable reflectors to change the optical path lengths.

Figure 16:
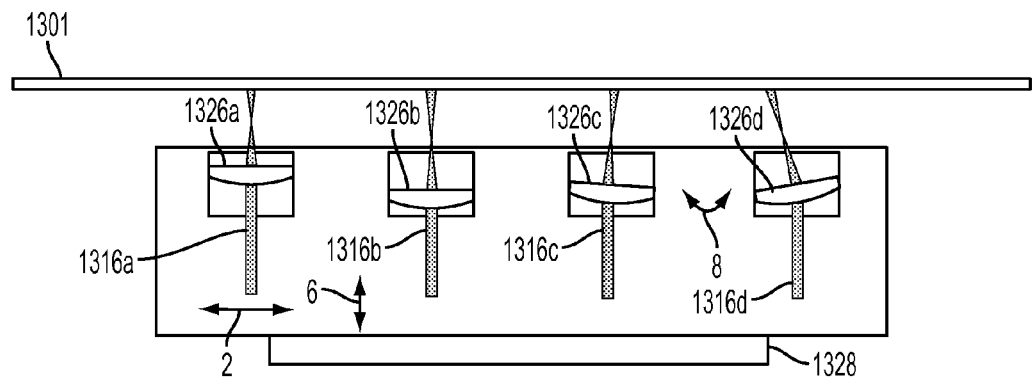
FIG. 16 is a schematic end view of an array of imaging lenses used in an embodiment of the multiple beamlet laser beam delivery system.

As shown in FIG. 16, the imaging optics 1324 includes objective lenses 1326a-1326d for imaging each of the respective beamlets 1316a-1316d onto a process plane of the workpiece 1301. As used herein, the "process plane" refers to a plane on or in the workpiece where the laser is directed to machine the workpiece, for example, by causing ablation. The process plane may be a top or bottom surface of the workpiece or a plane within the workpiece (e.g., at an interface between a substrate and a coating). One or more of the imaging lenses 1326a-1326d may be adjustable with various degrees of freedom either together or individually to adjust various parameters of the beamlets 1316a-1316d imaged on the process plane.

The lenses 1326a-1326d may be moved in the direction of arrow 6 along the axes of the beamlets 1616a-1616d (e.g., along the Z axis) to adjust the focus or demagnification, thereby changing the size and/or energy density of the shaped beam spot imaged on the process plane of the workpiece 1301. In one embodiment, the imaging optics 1324 may be coupled to a positioning stage 1328 that moves all of the lenses 1326a-1326d together in the Z axis. A motion system may be used to precisely position the positioning stage 1328 and the imaging optics 1324 at a desired position, thereby providing multiple beamlet real-time focus adjustment, for example, in response to changes in the height or thickness of the workpiece 1301. The motion system may include a motor (not shown) to effect the movement and an encoder (not shown) to provide position feedback.

The lenses 1326a-1326d may also be mounted for individual movement along the respective axes of the beamlets 1616a-1616d, thereby providing individual focus adjustment. For example, each of the lenses 1326a-1326d may be mounted within individual lens holders (not shown) that are capable of moving in the direction of arrow 6 to provide the individual focus adjustment.

The lenses 1326a-1326d may further be mounted for individual tilt adjustment. Each of the lenses 1326a-1326d may be mounted within individual lens holders (not shown) that are capable of pivoting about one or more axes orthogonal to the beamlets 1316a-1316d to provide the tilting adjustment. Adjusting the tilt of the lenses 1326a-1326d in the direction of a scribe or scanning axis (e.g., pivoting in the direction of arrow 9 shown in FIG. 15) allows individual pointing adjustment of the beamlets 1616*a*-1616*d* in the direction of the scribe. Adjusting the tilt of the lenses 1326*a*-1326*d* in a direction orthogonal to the scribe or scanning axis (e.g., pivoting in the direction of arrow 8 shown in FIG. 16) allows individual adjustment of the pitch of the beamlets 1616*a*-1616*d* imaged onto the process plane of the workpiece 1301.

One or more of the lenses 1326*a*-1326*d* may also be adjustable laterally, for example, to accommodate a lateral shift of the respective beamlets 1616*a*-1616*d*. The imaging optics 1324 may be mounted such that all of the lenses 1326*a*-1326*d* are movable together laterally in the direction of arrow 2. The lenses 1326*a*-1326*d* may also be mounted within individual lens holders (not shown) that are capable of lateral movement in the direction of arrow 2.

The optical head 1300 may also include one or more sensors 1340, 1342 for sensing top or bottom surface or process plane of the workpiece to determine changes in relative height and/or thickness of the workpiece. One example of the sensors 1340, 1342 may generate sensor laser beams, such as red 650 nm laser beams, that reflect off of a surface or process plane of the workpiece. In the exemplary embodiment, the sensors 1340, 1342 are located before and after the imaging optics 1324 to sense changes in the surface(s) or process plane in advance of scribing the lines. As the sensors 1340, 1342 sense changes in the surface(s) or process plane, the imaging optics 1324 may be moved along the beamlet axes to provide realtime focus adjustment in response to those changes, for example, to provide a consistent demagnification on the process plane during the scribe.

Figure 13:
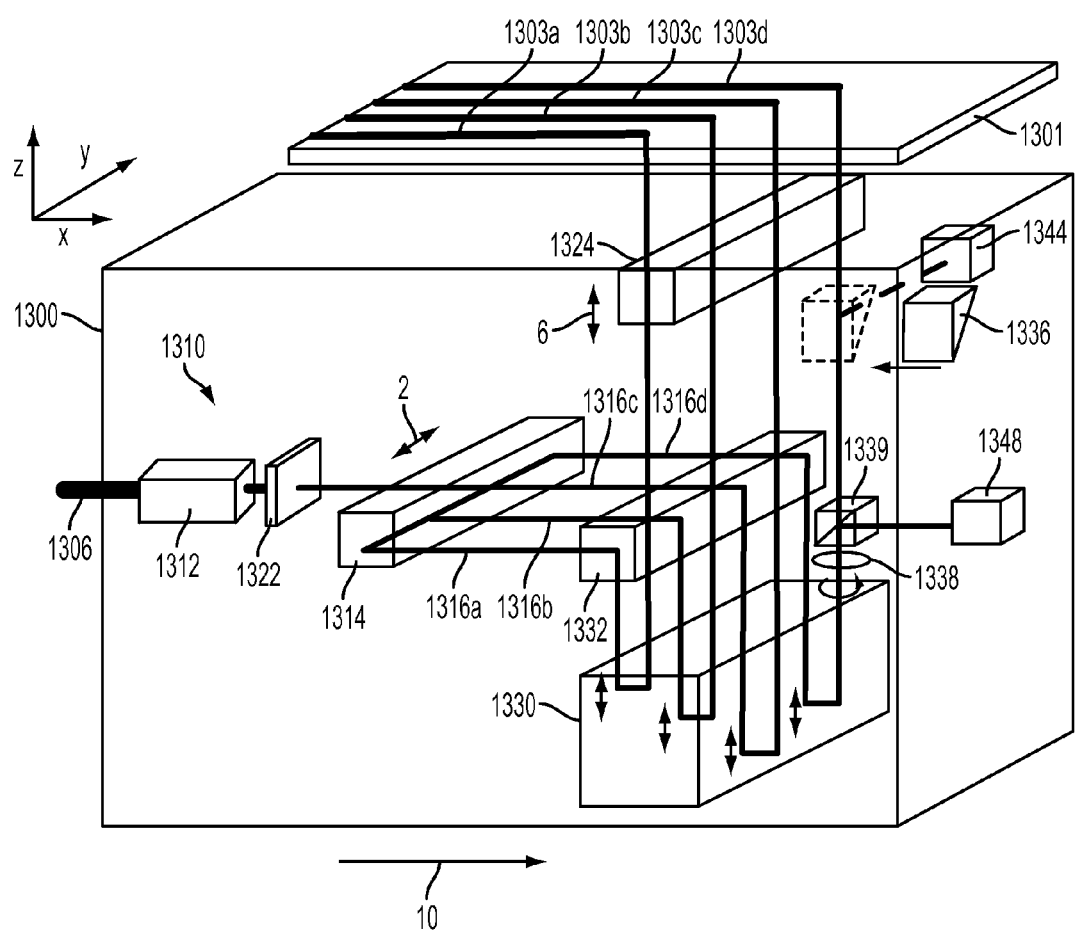
FIG. 13 is a schematic perspective view an embodiment of a movable optical head including a multiple beamlet laser beam delivery system that splits a beam after a mask projection.

The optical head 1300 may further include one or more beamlet blockers for blocking one or more of the beamlets 1316*a*-1316*d*. As shown in FIGS. 13 and 15, for example, the beamlet blockers including one or more reflectors 1336 that are moveable into the path of one or more respective beamlets 1316*a*-1316*d* to reflect the respective beamlets and effectively block the beamlets from passing through the imaging optics 1324. Although only one reflector 1336 is shown, multiple reflectors may be used to block each of the beamlets individually. The reflectors 1336 may be movable using an actuator, such as a pneumatic actuator, to allow real-time beamlet blocking of each of the beamlets individually. When the reflector(s) 1336 are located in the beamlet path, the beamlets may be reflected to a beam dump 1344.

The beam delivery system 1310 may also include a variable attenuator for providing calibrated, continuously variable individual beamlet attenuation. As shown in FIGS. 13 and 15, one embodiment of a variable attenuator includes one or more optical components 1338, 1339 located in each beam path for selectively filtering and rejecting a portion of the beam to a beam dump 1348. The optical components may include, for example, a one quarter waveplate 1338 that rotates to change the polarization of the respective beamlet and a polarization beam splitter cube 1339 that splits and rejects a portion of the beamlet based on polarity. The waveplate 1338 may be coupled to a motor via a gear (not shown), which rotates the waveplate 1338 to change the polarity, thereby changing the amount of the beamlet that is rejected by the polarization beam splitter cube 1339 and thus the attenuation. Although the components 1338, 1339 are shown in only one beamlet path, similar components may be provided in each of the beamlet paths.

The beam dumps 1344, 1348 may be air cooled beam dumps including, for example, heat transfer elements (e.g., fins) on the outside of the optical head 1300. Air cooled beam dumps provide advantages by using the flow of air caused by the motion of the optical head 1300 to provide convection cooling and avoiding having water flow to the optical head 1300 (e.g., in a water cooled beam dump). Dissipating heat from the optical head 1300 helps to maintain accuracy.

The beam delivery system 1310 may further include other optical components for controlling the shape, size, orientation, uniformity, and strength of the beam 1306 or beamlets 1316*a*-1316*d*. For example, the beam delivery system 1310 may include prisms or reflectors capable of rotating the beam 1306 and/or the beamlets 1316*a*-1316*d* about their axes.

A beamlet power meter 1346 may be used to measure the power of one or more of the individual beamlets 1316*a*-1316*d*. The power of the individual beamlets 1316*a*-1316*d* may then be adjusted accordingly, for example, to provide a consistent beamlet power. One way to adjust the power of the individual beamlets 1316*a*-1316*d* is by adjusting the attenuation of one or more of the beamlets 1316*a*-1316*d*. The laser power may also be adjusted to adjust the power of all of the beamlets. The beamlet power meter 1346 may be mounted in a location such that the optical head 1300 may be moved opposite the beamlet power meter 1346 to direct the beamlets 1316*a*-1316*d* into the beamlet power meter 1346, for example, when the optical head is not being used for scribing. The beamlet power meter 1346 may also be mounted on a linear stage opposite the optical head 1300 such that the beamlet power meter 1346 is capable of movement with the optical head 1300 to allow beamlet power to be monitored substantially continuously during processing. Beamlet power data may also be logged in real time during processing.

A scanning camera 1348 may also be mounted on or in the optical head 1300 or on the scanning stage. The camera 1348 may be remotely focused to view the scribes 1302*a*-1302*d* formed on the workpiece 1301 as the optical head 1300 moves along the scanning axis. The camera 1348 may be used to inspect the scribes 1302*a*-1302*d* for measuring alignment, quality, width, pitch and/or offset of the scribes. During set up of the beam delivery system 1310, the scanning camera 1348 may be used to measure a parameter of a test scribe and one or more components of the beam delivery system 1310 may be adjusted accordingly, as described above. If the test scribe does not have the desired width, for example, an aperture of an RVA mask may be adjusted to provide the desired scribe width.

Figure 17:
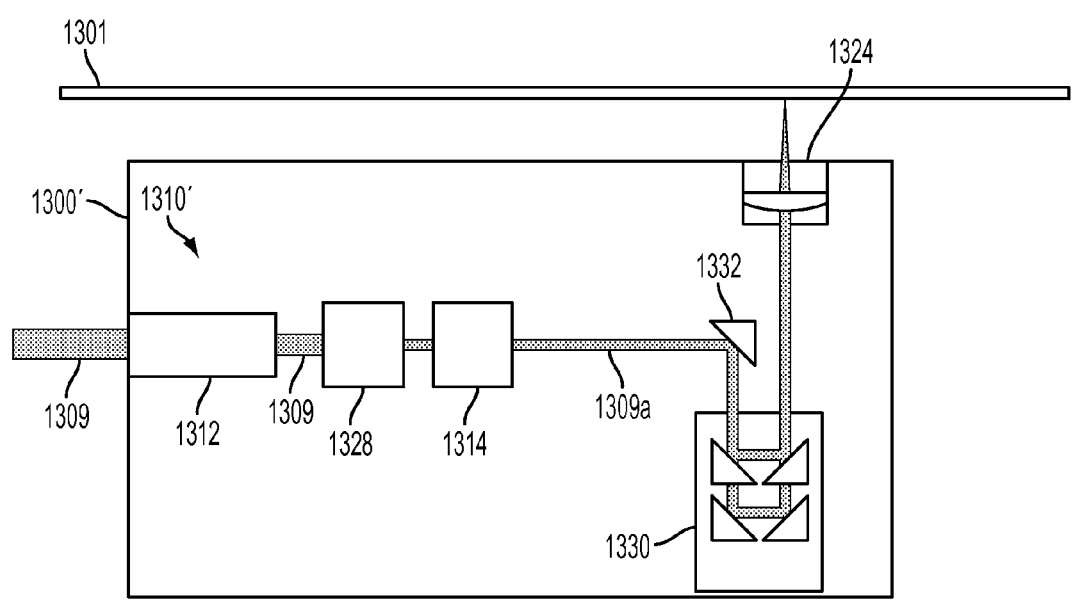
FIG. 17 is a schematic perspective view of an embodiment of a movable optical head including a multiple beamlet laser beam delivery system that uses beam shaping and far field focusing.

FIG. 17 shows yet another embodiment of an optical head 1300' including a beam delivery system 1310'. This embodiment is similar to the beam delivery system 1310 but includes beam shaping optics 1328 instead of a mask and uses a far-field focusing technique instead of a near-field imaging technique. The beam shaping optics 1328 may include one or more lenses designed to change the shape of the beam 1309, for example, to a line shaped beam. One example of such beam shaping optics 1328 includes an anamorphic lens system configured to shape the beam in a manner that forms an astigmatic focal beam spot that may be focused on the workpiece. The use of an astigmatic focal beam spot is described in greater detail in U.S. Pat. No. 7,388,172, which is fully incorporated herein by reference.

Accordingly, a multiple beamlet laser beam delivery system, consistent with the embodiments described herein, delivers multiple beamlets to a workpiece while moving along a laser scanning axis and with minimal wandering of the beamlets. The multiple beamlet laser beam delivery system also improves positional accuracy, quality and consistency of the scribe lines formed on the workpiece.

Consistent with one embodiment, a laser machining system includes a part handling system including a workpiece support surface for supporting a workpiece to be machined and at least one laser source for generating at least one laser beam. At least one laser scanning stage is positioned relative to the part handling system for linear movement along a scanning axis, and an optical head is located on the laser scanning stage. The optical head includes a beam delivery system for receiving the laser beam and modifying the beam while moving. The beam delivery system includes a beam splitter for splitting the laser beam into multiple beamlets, a mask for providing an aperture shape, and imaging optics for directing the multiple beamlets to a workpiece and for imaging the aperture shape on the workpiece.

Consistent with another embodiment, an optical head includes a beam delivery system for receiving a laser beam from a laser source. The beam delivery system includes a mask including an aperture for projecting a shaped portion of the laser beam, a beam splitter for splitting the shaped portion of the laser beam into multiple shaped beamlets, and a plurality of reflectors for receiving and reflecting respective ones of the multiple shaped beamlets. Each of the reflectors are positioned at different positions such that a length of an optical path of each of the multiple shaped beamlets is substantially the same. The beam delivery system further includes an array of imaging lenses for directing respective ones of the multiple shaped beamlets to the workpiece such that a shape of the aperture of the mask is imaged on the workpiece.

Consistent with a further embodiment, an optical head includes a beam delivery system for receiving a laser beam from a laser source. The beam delivery system includes a beam splitter for splitting the laser beam into multiple beamlets, a homogenizer for homogenizing either the beam before the beam splitter or the beamlets after the beam splitter, and an imaging section for imaging the beamlets onto a workpiece. The imaging section includes a mask defining a plurality of apertures, wherein the beamlets overfill the respective apertures of the mask, the imaging system further including a lens array for focusing respective imaged beamlets passing through the apertures of the mask.

Consistent with yet another embodiment, a laser machining system includes a part handling system including a workpiece support surface for supporting a workpiece to be machined and at least one laser source for generating at least one laser beam. At least one laser scanning stage is positioned relative to the part handling system for linear movement along a scanning axis, and an optical head is located on the laser scanning stage. The optical head includes a beam delivery system for receiving the laser beam and modifying the beam while moving. The beam delivery system includes a beam splitter for splitting the laser beam into multiple shaped beamlets and a plurality of reflectors for receiving and reflecting respective ones of the multiple beamlets. Each of the reflectors are positioned at different positions such that a length of an optical path of each of the multiple beamlets is substantially the same. The beam delivery system further includes an array of focusing lenses for focusing respective ones of the multiple beamlets onto the workpiece.

Consistent with yet another embodiment, a laser machining method includes: generating a laser beam using a laser mounted on a fixed base of a laser machining system; directing the laser beam into a beam delivery system located within a movable optical head; moving the optical head along a linear scan axis relative to the fixed base of the laser machining system; and modifying the laser beam within the beam delivery system while moving the optical head to produce multiple beamlets imaged on a process plane of a workpiece, wherein the imaged beamlets scribe lines along the workpiece as the optical head moves along the linear scan axis.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A laser machining system comprising:
   a part handling system including a workpiece support surface for supporting a workpiece to be machined;
   at least one laser source for generating at least one laser beam;
   at least one laser scanning stage positioned relative to the part handling system for linear movement along a scanning axis;
   an optical head located on the laser scanning stage, the optical head including a beam delivery system for receiving the laser beam and modifying the beam while moving, the beam delivery system comprising:
      a beam splitter for splitting the laser beam into multiple beamlets;
      a mask for providing an aperture shape; and
      imaging optics for directing the multiple beamlets to a workpiece and for imaging the aperture shape on the workpiece.

2. The laser machining system of claim 1 further comprising a homogenizer for homogenizing either the beam before the beam splitter or the beamlets after the beam splitter.

3. The laser machining system of claim 1 wherein the mask is located before the beam splitter and includes an aperture for projecting a shaped portion of the laser beam, and wherein the beam splitter is configured to split the shaped portion of the laser beam into the multiple beamlets.

4. The laser machining system of claim 3 wherein the laser beam overfills the mask by about 25% to 50%.

5. The laser machining system of claim 1 wherein the laser beam has a $M^2$ factor between 5 and 25.

6. The laser machining system of claim 1 wherein the mask is located after the beam splitter and includes a plurality of apertures for projecting shaped portions of respective ones of the multiple beamlets.

7. The laser machining system of claim 1 wherein the aperture shape is selected from the group consisting of a triangle, a diamond, a hexagon, a circle, and an ellipse.

8. The laser machining system of claim 1 wherein a length of an optical path length of each of the beamlets is substantially the same.

9. The laser machining system of claim 1 further comprising:
   an optical path length adjustment system for receiving the beamlets and providing independently adjustable lengths for the optical paths of the beamlets.

10. The laser machining system of claim 1 wherein each imaging lens in the imaging optics is mounted for tilt adjustment to adjust laser pointing of each of the beamlets independently.

11. The laser machining system of claim 1 wherein each imaging lens in the imaging optics is mounted for translation along axes of the beamlets to adjust demagnification of the beamlets independently.

12. The laser machining system of claim 1 further comprising a lens array translation stage for translating a lens array in the imaging optics in a direction substantially along axes of the beamlets to adjust the focus of the beamlets relative to a process plane of the workpiece.

13. The laser machining system of claim 1 wherein the part handling system, the scanning stage and the optical head are arranged such that the optical head is located below the workpiece support surface.

14. The laser machining system of claim 1 further comprising:
at least one sensor for tracking changes in a surface or a process plane of a workpiece supported on the workpiece support surface relative to the optical head.

15. The laser machining system of claim 1 further comprising beam directing mirrors for changing direction of the beamlets and for adjusting magnification.

16. The laser machining system of claim 1 further comprising at least one scanning camera mounted for movement with the laser scanning stage and configured to view at least one scribe line formed on the workpiece as the laser scanning stage moves along the scanning axis.

17. An optical head comprising:
a beam delivery system for receiving a laser beam from a laser source, the beam delivery system comprising:
a mask including an aperture for projecting a shaped portion of the laser beam;
a beam splitter for splitting the shaped portion of the laser beam into multiple shaped beamlets;
a plurality of reflectors for receiving and reflecting respective ones of the multiple shaped beamlets, each of the reflectors being positioned at different positions such that a length of an optical path of each of the multiple shaped beamlets is substantially the same; and
an array of imaging lenses for directing respective ones of the multiple shaped beamlets to the workpiece such that a shape of the aperture of the mask is imaged on the workpiece.

18. The optical head of claim 17 wherein the mask is a rectangular variable aperture (RVA) mask configured to adjust at least a width of the shaped portion of the laser beam.

19. A laser machining method comprising:
generating a laser beam using a laser mounted on a fixed base of a laser machining system;
directing the laser beam into a beam delivery system located within a movable optical head;
moving the optical head along a linear scan axis relative to the fixed base of the laser machining system; and
modifying the laser beam within the beam delivery system while moving the optical head to produce multiple beamlets imaged on a process plane of a workpiece, wherein the imaged beamlets scribe lines along the workpiece as the optical head moves along the linear scan axis.

20. The laser machining method of claim 19 wherein the workpiece is located above the movable optical head, and the multiple beamlets are directed upward to the workpiece.

21. The laser machining method of claim 19 wherein generating the laser beam includes generating a noncoherent laser beam with a flat top profile and an $M^2$ factor greater than 5.

22. The laser machining method of claim 19 wherein modifying the laser beam to produce multiple beamlets comprises:
passing the laser beam through a beam splitter to produce the multiple beamlets;
directing each of the multiple beamlets onto a mask such that shaped beamlets are projected through respective mask apertures; and
passing the shaped beamlets through respective imaging lenses such that the shaped beamlets image a shape of the mask apertures on a process plane of the workpiece.

23. The laser machining method of claim 19 wherein modifying the laser beam to produce multiple beamlets comprises:
directing the laser beam onto a mask such that a shaped portion of the laser beam is projected through a mask aperture;
passing the shaped portion of the laser beam through a beam splitter to produce shaped beamlets; and
passing the shaped beamlets through respective imaging lens such that the shaped beamlets image a shape of the mask aperture on a process plane of the workpiece.

24. The laser machining method of claim 19 wherein modifying the laser beam to produce multiple beamlets comprises:
shaping the laser beam; and
focusing the laser beam onto a process plane of the workpiece.

25. The laser machining method of claim 19 further comprising:
adjusting a width of each of the multiple beamlets.

26. The laser machining method of claim 19 further comprising:
adjusting a pitch of the multiple beamlets on the process plane of the workpiece.

27. The laser machining method of claim 19 further comprising:
adjusting pointing of at least one of the multiple beamlets independent of other ones of the multiple beamlets.

28. The laser machining method of claim 19 wherein a length of an optical path of each of the multiple beamlets is substantially the same.

29. The laser machining method of claim 19 further comprising:
adjusting a length of an optical path of at least one of the multiple beamlets independent of other ones of the multiple beamlets.

30. The laser machining method of claim 19 further comprising:
adjusting a focus of at least one of the multiple beamlets independent of other ones of the multiple beamlets.

31. The laser machining method of claim 19 further comprising:
monitoring power of at least one of the multiple beamlets.

32. The laser machining method of claim 31 further comprising:
adjusting power of the at least one of the multiple beamlets in response to monitoring the power.

* * * * *